(12) United States Patent
Degani et al.

(10) Patent No.: US 11,422,227 B2
(45) Date of Patent: Aug. 23, 2022

(54) METHODS OF DETECTING OBJECTS IN ENVIRONMENTS USING COEXISTING RADAR DEVICES

(71) Applicant: Inxpect S.p.A., Brescia (IT)

(72) Inventors: Alessio Degani, Brescia (IT); Marco Garatti, Brescia (IT); Andrea Tartaro, Brescia (IT)

(73) Assignee: INXPECT S.p.A., Brescia (IT)

( * ) Notice: Subject to any disclaimer, the term of this patent is extended or adjusted under 35 U.S.C. 154(b) by 130 days.

(21) Appl. No.: 16/879,481

(22) Filed: May 20, 2020

(65) Prior Publication Data

US 2020/0371221 A1  Nov. 26, 2020

(30) Foreign Application Priority Data

May 21, 2019   (IT) .................. 102019000007061

(51) Int. Cl.
*G01S 7/02* (2006.01)
*G01S 7/35* (2006.01)
(Continued)

(52) U.S. Cl.
CPC ............ *G01S 7/023* (2013.01); *G01S 7/0235* (2021.05); *G01S 7/354* (2013.01); *G01S 13/003* (2013.01); *G01S 13/04* (2013.01)

(58) Field of Classification Search
CPC ..... G01S 7/02; G01S 7/35; G01S 7/23; G01S 7/023; G01S 7/0235; G01S 7/354;
(Continued)

(56) References Cited

U.S. PATENT DOCUMENTS 3,911,432 A * 10/1975 Williams ................ G01S 7/023
342/59
5,646,607 A * 7/1997 Schurmann .......... G06K 7/0008
340/10.2
(Continued)

FOREIGN PATENT DOCUMENTS

EP          3306339 A1    4/2018

OTHER PUBLICATIONS

Italian Search Report and Written Opinion in corresponding Italian Application No. 102019000007061 dated Jan. 27, 2020, 9 pages.

*Primary Examiner* — Erin F Heard
*Assistant Examiner* — Michael W Justice
(74) *Attorney, Agent, or Firm* — MH2 Technology Law Group LLP (57) ABSTRACT

A method of detecting objects in an environment using coexisting radar devices is disclosed. According to the method, the transmission intervals of the devices are spaced apart by a wait time given by the sum of a base time, common to all the radar devices, and respective time delays, differing between devices and shorter than the base time. For each pair of devices the difference between the time delays is less than the transmission time but is at least twice a risk time in which a collision between the signals of different radar devices can be confused for an object to be detected. Given a sequence of detection cycles, a radar device is determined to have detected a target if the result of the detection is positive for a number of consecutive detections which is at least equal to the number of radar devices.

15 Claims, 3 Drawing Sheets

(51) Int. Cl.
*G01S 13/00* (2006.01)
*G01S 13/04* (2006.01)

(58) Field of Classification Search
CPC ........ G01S 13/04; G01S 13/34; G01S 13/034; G01S 13/87; G01S 13/087; G01S 13/003; G01S 13/931
USPC .......................................................... 342/27
See application file for complete search history.

(56) References Cited

U.S. PATENT DOCUMENTS

| | | | | |
|---|---|---|---|---|
| 5,736,956 | A * | 4/1998 | Kennedy | G01S 7/288 342/90 |
| 6,384,771 | B1 * | 5/2002 | Montague | G01S 7/4052 342/170 |
| 7,697,896 | B2 * | 4/2010 | Maekawa | H04W 92/02 455/63.1 |
| 7,822,424 | B2 * | 10/2010 | Markhovsky | G01S 13/74 455/456.1 |
| 8,502,730 | B2 * | 8/2013 | Roche | G01S 13/87 342/61 |
| 9,395,435 | B2 * | 7/2016 | Kuo | G01S 13/931 |
| 9,513,365 | B2 * | 12/2016 | Morita | G01S 13/87 |
| 9,575,175 | B2 * | 2/2017 | Grooters | G01S 13/933 |
| 9,664,777 | B2 * | 5/2017 | Kishigami | G01S 7/0235 |
| 9,753,121 | B1 * | 9/2017 | Davis | G01S 7/282 |
| 9,829,567 | B1 * | 11/2017 | Davis | G01S 13/70 |
| 9,880,261 | B2 * | 1/2018 | Subburaj | G01S 7/032 |
| 10,317,511 | B2 * | 6/2019 | Paradie | G01S 7/023 |
| 10,539,669 | B2 * | 1/2020 | Ikram | G01S 13/42 |
| 10,775,478 | B2 * | 9/2020 | Davis | G01S 7/0233 |
| 11,035,928 | B2 * | 6/2021 | Subburaj | G01S 13/87 |
| 11,125,854 | B2 * | 9/2021 | Ray | G01S 7/023 |
| 11,125,856 | B2 * | 9/2021 | Ikram | G01S 7/352 |
| 2004/0130482 | A1 * | 7/2004 | Lin | G01S 7/023 342/82 |
| 2006/0012476 | A1 * | 1/2006 | Markhovsky | G01S 13/74 340/539.32 |
| 2006/0221926 | A1 * | 10/2006 | Maekawa | H04W 92/02 370/345 |
| 2006/0262009 | A1 * | 11/2006 | Watanabe | G01S 7/0235 342/159 |
| 2010/0245154 | A1 * | 9/2010 | Szajnowski | G01S 13/345 342/90 |
| 2011/0260907 | A1 * | 10/2011 | Roche | F03D 7/02 342/27 |
| 2013/0241766 | A1 * | 9/2013 | Kishigami | G01S 13/284 342/159 |
| 2014/0062753 | A1 * | 3/2014 | Grooters | G01S 7/4008 342/21 |
| 2014/0354470 | A1 * | 12/2014 | Kuo | G01S 13/931 342/200 |
| 2015/0048967 | A1 * | 2/2015 | Morita | G01S 7/02 342/59 |
| 2016/0103213 | A1 * | 4/2016 | Ikram | G01S 13/42 342/105 |
| 2017/0023663 | A1 * | 1/2017 | Subburaj | G01S 13/931 |
| 2017/0315211 | A1 * | 11/2017 | Subburaj | G01S 7/40 |
| 2018/0081029 | A1 * | 3/2018 | Davis | G01S 7/032 |
| 2018/0136311 | A1 * | 5/2018 | Paradie | G01S 7/023 |
| 2019/0178987 | A1 * | 6/2019 | Ikram | G01S 13/343 |
| 2020/0309897 | A1 * | 10/2020 | Ray | G01S 7/40 |
| 2021/0003664 | A1 * | 1/2021 | Davis | G01S 7/0233 |

* cited by examiner

METHODS OF DETECTING OBJECTS IN ENVIRONMENTS USING COEXISTING RADAR DEVICES

CROSS-REFERENCE TO RELATED APPLICATION(S)

This application claims priority under 35 U.S.C. § 119 from Italian Patent Application No, 102019000007061, tiled on May 21, 2019, in the Italian Patent and Trademark Office ("IPTO") the entire contents of which are incorporated herein by reference.

FIELD OF THE INVENTION

The present invention relates to the field of object detection by means of radar devices. More in detail, the invention relates to a detection method which solves problems of interference between signals transmitted by multiple radar devices in the same environment.

STATE OF THE ART

Prior art radar devices detect the presence of objects in an environment by transmitting an electromagnetic signal and detecting the signal reflected from the environment. When these signals are processed, a time delay of the reflected signal from the transmitted signal is generally recognized for determining the distance of the object that originated the reflection.

When multiple radar devices transmit electromagnetic signals in the same environment, if no appropriate measures are taken, it may happen that one of the devices transmits a signal and, while it waits for the reflected signal, it is instead impinged upon by a signal transmitted by another device. This phenomenon will be referred to herein as signal collision.

In this case, if the two signals are characterized by substantially the same waveform, and in particular by the same frequency pattern, confusion may happen between a signal transmitted by a device, that is reflected and received by the same device, and signals received by the device but which come from different devices, directly or indirectly after reflections in the environment.

As a result, the processing operations performed by the device may lead to report the presence of a non-existing object, as if it were located at a distance from the radar that depends on the time delay between signal transmissions from the two devices. In case of independently operating radar devices, this time delay is substantially random and therefore unpredictable. Furthermore, when the radar devices have similar settings, the time overlap of the transmitted signals may be consistently repeated through multiple consecutive cycles, always with similar delays, which are interpreted as an object that is always in the same area.

A known method for solving this drawback consists in coordinating the devices such that signal transmissions by the devices are temporally spaced apart, thereby avoiding overlaps. This method requires a central control unit that communicates with all the devices, but this cannot always be implemented, for example when the installation conditions require the presence of multiple radar devices that have been designed without the feature of the above discussed coordination.

In addition, as the devices transmitting in the same environment increase, the time separating two consecutive transmissions must be increased, so that all the devices can be activated sequentially while the other devices are waiting. This reduces the performance of the radar devices.

In a further prior art method, each radar device may transmit a signal in a different frequency band, thereby affording discrimination of the reflections of its own signal against the signals transmitted by other devices.

Nevertheless, in certain applications, technical and especially regulatory requirements only allow use of a narrow frequency band for radar transmissions. For example, the band prescribed for intrusion prevention monitoring by regulations in certain countries is as narrow as 24 to 24.25 GHz. The choice of different bands for different devices therefore leads to a further reduction of the band available to each device. This is often unacceptable because reducing the frequency band of a radar device results in proportional worsening of the radar resolution.

US2006262009 A1 discloses a possible solution, which consists in setting a pair of radars so that they will satisfy the formula $K \cdot T2+X2+X1 \leq T1 \leq (K+1) \cdot T2-X2-X1$, where $T1$ and $T2$ are the overall durations of the detection cycles of two radars, and $X1$ and $X2$ are the respective durations of the portions of the detection cycle in which the signal is transmitted. Due to this condition, in the event that the signals transmitted by the two radars overlap in time for one cycle, no time overlap will exist in the next cycle.

However, this condition requires the durations of the cycles of different radars to be significantly differentiated, and also long pauses to be interspersed between two consecutive transmissions of the same radar, to prevent any type of signal collision from repeating in consecutive cycles. Such pauses become particularly long if the number of radars increases, such that, within the pause between two transmissions of one and the same radar, the transmissions from all the other radars may occur with the required offset.

SUMMARY OF THE INVENTION

The object of the present invention is to obviate the problem of overlapping signals from different radar devices, while avoiding the aforementioned drawbacks associated with prior art methods. In particular, false alarms caused by signal collisions should be avoided without necessarily requiring a continuous central coordination of the transmissions, without significantly reducing the width of the frequency band used by the individual radar devices, but nonetheless reducing the overall duration of the detection cycles as compared with the system provided in US 2006262009 A1.

This and other objects are fulfilled by a method and a system for detecting objects in an environment as defined in any of the accompanying claims. Specifically, according to the invention the radar devices will transmit the signals spaced apart in time by different wait intervals. The wait intervals are selected as a sum of a common base time and different time delays for each radar device, shorter than the base time.

The applicant found that signal collisions lead to false alarms only if they occur within a risk interval, which consists of a relatively small sub-interval of the transmission interval. Outside the risk interval, a signal collision may be filtered off by the system, for example, as it generates a signal that is incompatible with the presence of targets in the environment of interest.

The selection of time delays differentiated between radar devices by at least twice the duration of the risk interval, possibly with small additional margins, eliminates the probability that, considering two separate radar devices, signal collisions in the risk interval will occur in multiple consecutive detection cycles. Therefore, even when constant time synchronization is not provided, signal collisions are not stable, and can be recognized with less false alarm risks.

In the most unfortunate case, signal collisions are caused in a detection device, at each cycle, by different devices from time to time. Once a number of cycles equal to the number of devices less one is attained, further consecutive collisions at risk might occur only if a collision at risk would be repeated between the same pair of devices multiple times in a short period of time.

This is, however, unlikely and can be avoided altogether if the base time is sufficiently long as compared to the different time delays to ensure that, considering a sequence of detection cycles that includes as many cycles as there are radar devices, there is no radar device that performs an integer number of cycles that is greater than that of the other radar devices.

Then, a signal detected by a device is only interpreted as an object if it is detected in a number of consecutive detection cycles equal to at least the number of radar devices.

In any case, the spacing between the time delays of the different radar devices is significantly smaller than in US 2006262009 A1 and accordingly the overall duration of the detection cycles can be also limited. In fact, the differences between the time delays according to the invention allow an important overlap of the transmission intervals of different radars, while they only cause a brief time stagger therebetween, which is in any case sufficient to reach the posed aims.

BRIEF DESCRIPTION OF FIGURES

Further features and advantages of the present invention will result more clearly from the illustrative, non-limiting description of a method and a system for detecting objects in an environment, with respect to the accompanying drawings, in which.

DETAILED DESCRIPTION

The invention relates to a method and a system for detecting objects in an environment. For this purpose, a predetermined number of radar devices, greater than one, preferably at least three, is provided.

Each radar device is configured to perform a sequence of detection cycles for detecting objects in the same environment. The case of interest for the invention is that the signal transmitted by a radar device can reach other devices, directly or indirectly through reflections in the environment, and maintain such an intensity as to emerge from the background noise typical of radar devices. For example, the fields of view of the radar devices may at least partially overlap or be distinct but close to each other as long as the aforementioned intensity condition is fulfilled.

The system comprises at least one control unit, preferably a plurality of control units each associated with a respective radar device. The control units may be substantially independent of each other, especially in setting start times for the respective radar devices for the transmission of the electromagnetic signal. The possibility of interdependencies between radar devices is not excluded in other respects, such as aggregation of data obtained from individual radar devices after transmission.

It should be noted that, as used herein, the term radar device may be intended as a device comprising a single transceiver (or other kind of component or pair of components capable of transmitting and receiving electromagnetic signals) or a plurality of transceivers coordinated by a common control unit. In other words, the invention may be used to solve the problem of interference between substantially independent transceivers, or between independent groups of transceivers, each of which identifies a radar device, whereby a known form of coordination may be provided within the group.

Each detection cycle of each radar device comprises, according to known techniques, transmitting an electromagnetic signal in the environment and receiving an electromagnetic signal from the environment, that follows the start of signal transmission by a certain time distance. The received signal can be originated by the same radar device, i.e. by the reflection of its own signal transmitted in the environment, or by different radar devices. In the latter case, a signal collision occurs, which means that the radar device, during its transmission interval, receives the electromagnetic signal transmitted by another radar device.

Still according to well-known techniques, at each detection cycle the processing of transmitted or received electromagnetic signals may provide, for each radar device, a positive or negative output. The positive output in particular indicates the fact that the radar device detects an electromagnetic signal that is compatible with the presence of an object to be detected in the environment, specifically within a maximum predetermined distance from the radar device. Nevertheless, as discussed above, despite the compatibility of the detected electromagnetic signal, the latter may actually correspond to signals transmitted by other devices. On the other hand, the negative output indicates the fact that the radar device does not detect an electromagnetic signal compatible with the presence of an object to be detected in the environment, within the maximum distance.

In the details of processing, for each radar device, the transmitted electromagnetic signal is combined with the received electromagnetic signal, providing a combined signal. The preferred signal combination is given by mixing these signals, i.e. generating a baseband signal. The combined signal in this case has a frequency given by the frequency difference between the transmitted signal and the received signal.

If the signal is transmitted with known techniques using, for example, frequency ramps (such as the FMCW technique further explained hereinbelow), the frequency of the combined signal is given by an increasing function of the time distance between the start of signal transmission and the start of signal reception, for example as a direct proportion. Thus, the frequency of the combined signal is also an increasing function of the distance of the objects to be detected.

Then, a low-pass filter is applied to the combined signal to generate a filtered signal. The filter is configured to damp the signal components beyond the maximum distance within which objects are to be detected.

In particular, an object at the maximum distance from the radar device has a maximum time distance and a maximum frequency corresponding thereto. The maximum time distance is given by the time taken for the electromagnetic signal to travel from the radar device to the object at the maximum distance, be reflected by the object, and return to the radar device. In other words, the maximum time distance represents the time distance of the electromagnetic signal originating from a reflection on the object at the maximum distance, after the start of the transmission of the electromagnetic signal.

On the other hand, the maximum frequency is the frequency assumed by the combined signal resulting from the combination of the transmitted signal with the received signal that is detected with the maximum time distance.

Therefore, it will be appreciated that any components of the combined signal beyond the maximum frequency cannot be caused by objects within maximum distance, but rather by objects of little interest beyond the maximum distance, or by signal collisions.

Thus, the filter is configured to filter off the components of the combined signal with a frequency higher than a predetermined frequency, referred to as risk frequency, which is equal to or greater than the maximum frequency, for example, to the extent required to prevent a certain damping from affecting even frequencies slightly below the maximum frequency.

The risk frequency corresponds to a risk time $T_r$, that is the time for which, if the received signal has a time distance from the start of the transmission that is greater than the risk time, the combined signal will have a frequency higher than the risk frequency, and will then be damped by the filter. The risk time is therefore preferably equal to the maximum time distance, or longer.

As a result of the processing example as described above, a positive output is generated not only when a real object is in the environment at a distance from the radar device that is less than the maximum distance, but also when a signal collision begins within a risk interval, i.e. the interval that begins from the start of the transmission interval and lasts throughout the risk time $T_r$. Conversely, if a signal collision begins within the transmission interval, but after the risk interval, filtering of the combined signal will lead to the generation of a negative output, except, of course, when real objects to be detected are present in the environment within the maximum distance from the radar device.

It should be noted that, with fixed objects in the environment, the signal received by the device may contain substantially permanent components associated with the presence of the fixed objects. Such components are known to be removed using background removal methods, such that only the components associated with any objects of interest, such as moving objects or objects foreign to the environment. Here, the positive output is intended to be generated only when objects are detected after removal of the background from the signal. In other words, the objects to be detected preferably do not comprise the fixed objects of the environment.

As more clearly explained below, in one aspect of the invention a single positive output in a detection is not sufficient to determine that a radar device has detected an object. For such determination the invention provides conditions related to a specific type of detection cycle.

In particular, each detection cycle of each radar device shall comprise a transmission interval and a wait interval. During the transmission interval, the radar device is configured to transmit a predetermined electromagnetic signal EM in the environment for a transmission time $T_t$. The wait interval falls between two transmission intervals of consecutive detection cycles.

In the wait interval, the device may be configured to remain substantially silent. In this case, the device does not transmit any electromagnetic signal or transmits an electromagnetic signal with a negligible power with respect to the power of the predetermined electromagnetic signal EM, for example lower than the predetermined electromagnetic signal EM by at least 10 dB.

Alternatively, in the wait interval the device may be configured to transmit an electromagnetic signal EM' that differs from the predetermined electromagnetic signal EM to a significant extent. This difference is intended to be satisfied when the overlap between such signal EM' and the predetermined electromagnetic signal EM is not considered by the radar device to be compatible with the presence of an object to be detected in the environment.

For example, during the wait interval the frequency of the possible transmitted signal EM' may differ from the frequency of the predetermined electromagnetic signal EM, or the frequencies may be the same but with a significantly different time shape. Conversely, in the aforementioned case of a signal transmitted with a negligible power, it may also have a frequency with a time shape substantially corresponding to that of the predetermined electromagnetic signal EM.

In the preferred embodiment, the predetermined electromagnetic signal EM is transmitted according to a frequency-modulated continuous-wave modulation (FMCW), in particular with linear increasing and/or decreasing frequency ramps. Here, one option is considering an entire predetermined sequence of successive ramps as a transmission interval, whereas in the wait interval the device is silent. Alternatively, a transmission interval may be considered as an interval that only contains one or more ramps of a first type, i.e. increasing or decreasing, whereas the wait interval contains at least one ramp of a second type, i.e. increasing or decreasing, other than the first type, and no ramp of the first type. After such a ramp of the second type, the radar device may remain silent for the rest of the wait interval.

Figure 2:
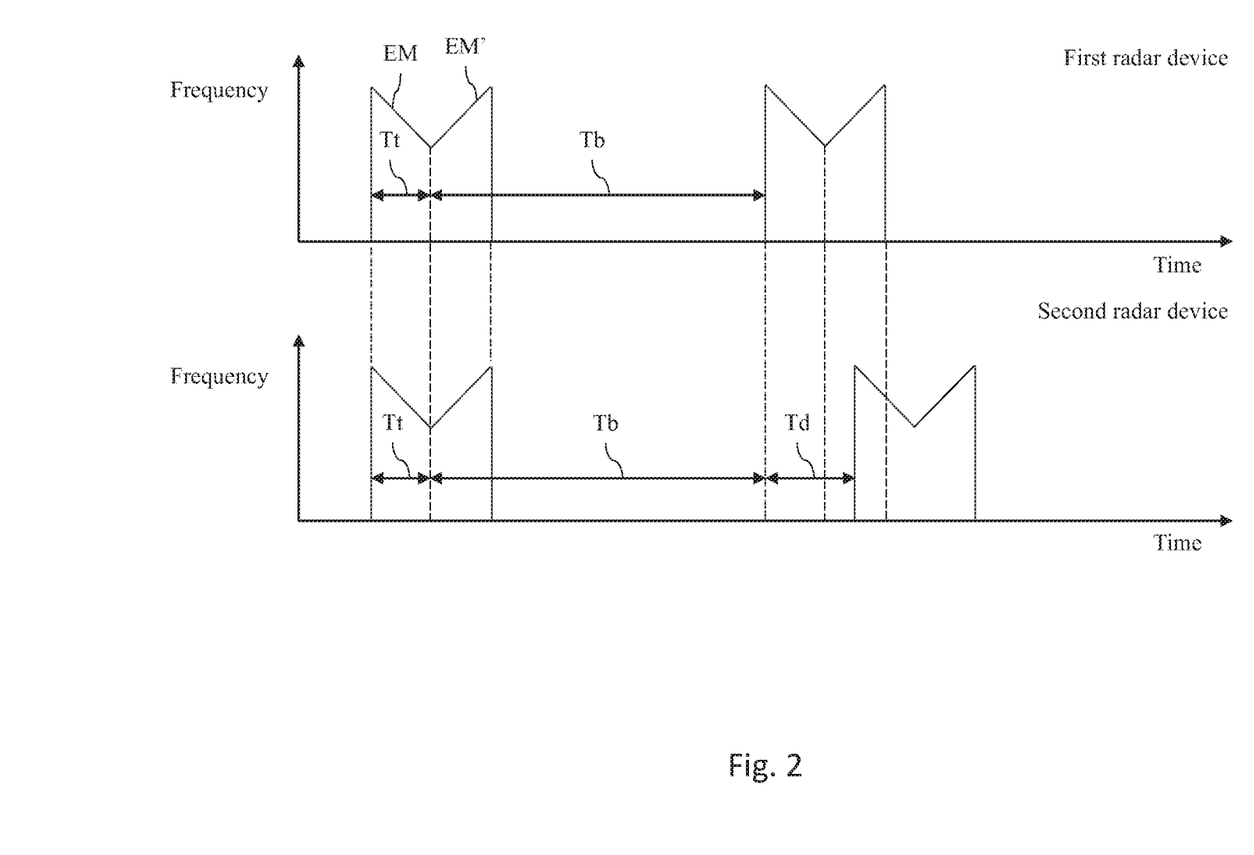

As shown in FIG. 2, in the latter case a given number of overlaps of ramps of different types associated with distinct radar devices are permitted. However, such overlaps, processed with the usual techniques, generate at most a high level of signal noise distributed over a wide range of distances, which can be easily distinguished from objects in the environment, generally associated with higher signal peaks concentrated in a narrow range of distances.

Figure 1:
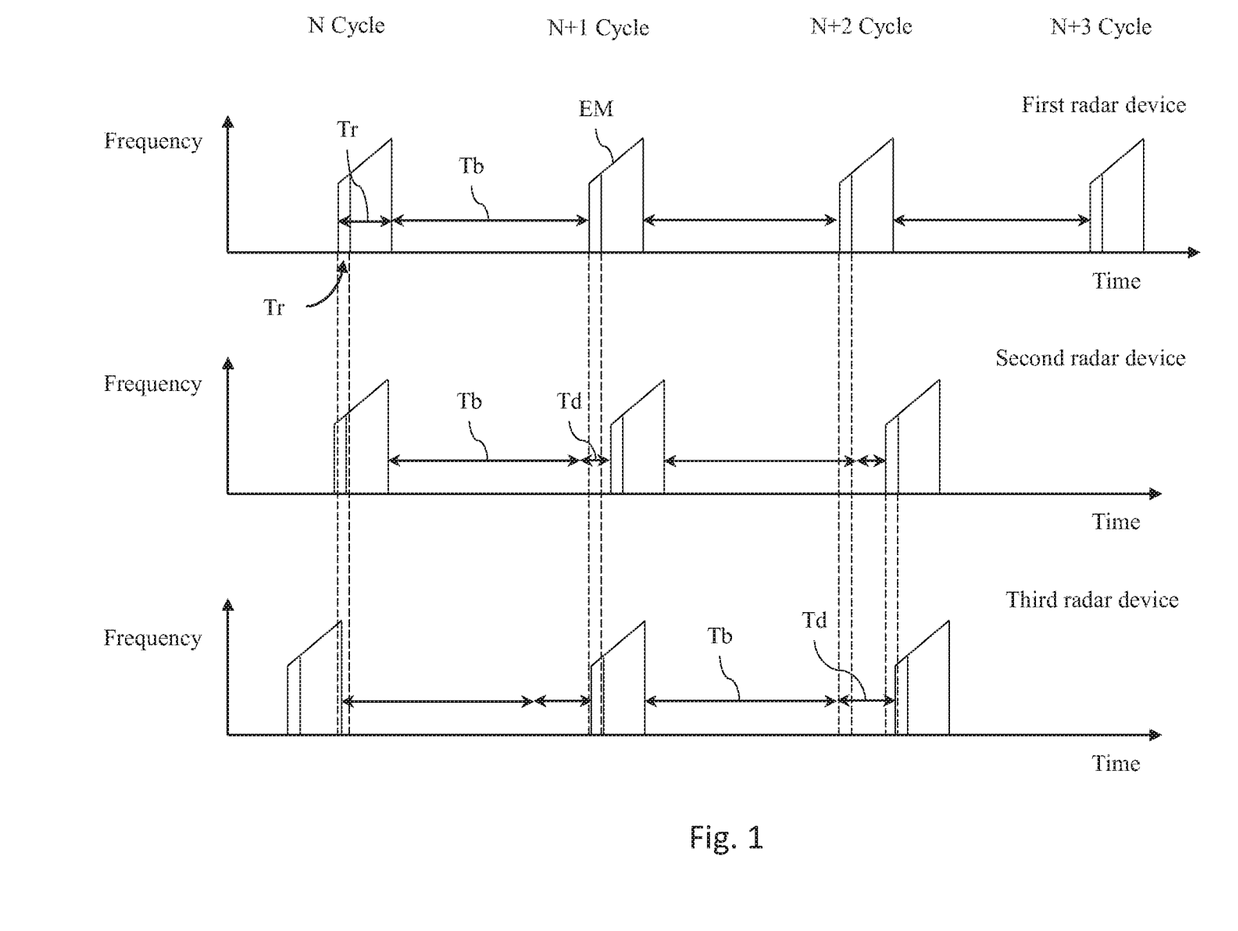
FIG. 1 schematically shows the time shape of the electromagnetic signals transmitted in a few detection cycles by three radar devices according to one embodiment of the invention, FIG. 2 schematically shows an example that is not part of the invention, with an alternative time shape of the transmitted electromagnetic signal, and FIG. 3 schematically shows an example that is not part of the invention, with a reduced difference between time delays in signal generation by two radar devices.
Figure 3:
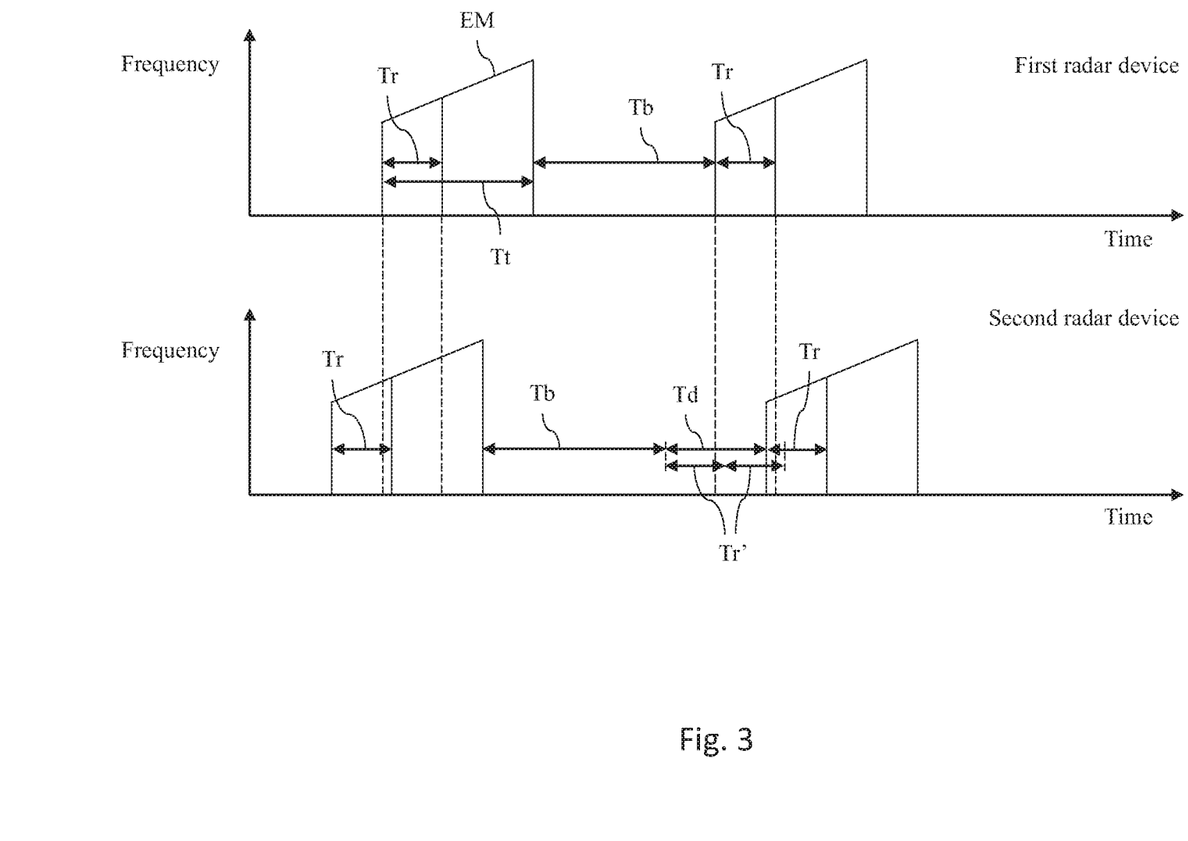

Signal overlaps with ramps of the same type, i.e. the aforementioned signal collisions, will be further described below. Therefore, FIGS. 1 and 3 depict only an example of increasing ramp.

More in detail, in the detection cycles, the transmission time $T_t$ is common to all the radar devices. However, the wait interval is different in all the radar devices, and in particular the duration of the wait interval is equal to the sum of a base time $T_b$, common to all the radar devices, and a respective time delay $T_d$, where the time delays $T_d$ of the radar devices are different from one another. The time delays $T_d$ are preferably kept substantially constant for each radar device throughout the sequence of detection cycles.

In the plurality of radar devices, one radar device can be allowed to be associated with a zero-time delay $T_d$, whereas positive time delays $T_d$ are selected for the remaining radar devices.

When choosing the base time $T_b$ and the time delays $T_d$, the base time $T_b$ is longer than each of the time delays $T_d$ of the radar devices. This ensures that, in the time interval in which a radar device is transmitting the predetermined electromagnetic signal EM twice, no other radar device can transmit the predetermined electromagnetic signal EM three times. Therefore, in the case of an overlap between the transmission intervals of two radar devices in a specific detection cycle, for example the cycle N, the next transmission interval of a device, in the cycle N+1, may possibly overlap only the transmission interval N+1 of the other device, and not further successive transmission intervals, such as N+2. The following describes how to avoid overlaps even for the interval N+1.

If the above concept is extended to longer detection sequences, preferably the base time $T_b$ and the time delays $T_d$ are selected such that, for each pair of radar devices comprising a first radar device associated with a longer time delay $T_d$ (hence a slower radar) and a second radar device associated with a shorter time delay $T_d$ (hence a faster radar), in a total time taken by the first radar device to perform a number of complete detection cycles equal to the predetermined number of radar devices, the second radar device performs a number of complete detection cycles that is smaller than the predetermined number of radar devices plus one, that is, a number of complete cycles equal to the predetermined number of radar devices plus an incomplete fraction of a cycle.

This condition ensures that, for a sequence of detection cycles of significant duration, given at least by the number of detection devices, the overlaps between two radar devices can occur only between transmission intervals of corresponding numbers (for example N with N, N+1 with N+1, N+2 with N+2 . . . ), and not different numbers (e.g. N with N+2).

This condition may be fulfilled in practice by setting a base time $T_b$ greater than the product of the predetermined number of radar devices and each of the time delays $T_d$ of the radar devices.

In other words, the time delays $T_d$ are selected in a range from zero to the base time $T_b$, preferably from zero to the ratio of the base time $T_b$ to the number of radar devices.

As noted above, false alarms risk to be generated for signal collisions only if the collision begins within the risk interval. In order to prevent collisions in the risk interval of a pair of radar devices from overlapping for consecutive detection cycles, the time delays $T_d$ for each radar device are set to differ for each pair of radar devices at least by twice the risk time $T_r$.

FIG. 3 explains this feature by showing the case (contrary to this embodiment) of a difference between the time delays $T_d$ of slightly less than twice the risk time $T_r$, allowing for two consecutive signal collisions in the risk intervals. In particular, a zero time delay $T_d$ is assumed for the first radar, and a time delay $T_d$ of less than twice the risk time $T_r$ is assumed for the second radar device, as shown by the arrows $T_r'$, whose length is equal to the risk time $T_r$.

In real conditions, however, it may be appropriate to introduce an additional safety margin, since the time at which the transmission of the signal by a radar device actually begins may not coincide with the signal transmission trigger time.

Therefore, for each pair of radar devices the respective time delays $T_d$ will preferably differ by at least the sum of twice the risk time $T_r$ and a delay margin. The delay margin is given by an estimate, for the radar devices, of a maximum time between the signal transmission trigger time, and the time at which the transmission of the electromagnetic signal actually begins. In the preferred embodiment, the delay margin is equal to the risk time $T_r$, i.e. the time delays $T_d$ differ from one radar device to the other at least three times the risk time $T_r$. In the preferred embodiments, the time delays $T_d$ are selected as a sum, for each radar device, of a fixed delay component, equally spaced for the various radar devices, and a random delay component. The fixed delay component can be given, for example, by the sequence of integer or zero multiples of the value that is twice or three times the risk time $T_r$, according to the above discussed criteria. In other words, the fastest radar device may have a zero fixed component of the time delay $T_d$, and the subsequent radar devices may have fixed components of the time delays $T_d$ equal to $2T_r$, $4T_r$ . . . up to the slowest radar device, or $3T_r$, $6T_r$ . . .

The random component of the time delay $T_d$ is introduced to prevent signal collisions in the risk intervals from repeatedly occurring at fixed intervals, given by a certain number of detection cycles (although a large number, in particular larger than the number of the radar devices).

The random component of the time delay $T_d$ is randomly selected for the different radar devices, but once it has been selected it remains fixed through the different detection cycles performed by each radar device. The random component is selected within a sufficiently narrow range of values to ensure that in any case the difference between the time delays $T_d$ of each radar pair is at least twice the risk time $T_r$. For example, the random component may range, for each radar device, from zero to the above discussed delay margin, which is included in the fixed component.

However, the introduction of random components is optional, and hence the time delays $T_d$ may also be equally spaced exactly as described above for the fixed components of the time delays $T_d$.

By setting these differences in time delays $T_d$, for each pair of radar devices, signal collisions are prevented from occurring in the risk interval more than once for a second number of consecutive detection cycles, equal to at least two.

The time distance between the starts of the transmission intervals with the same number will increase for detection cycles that are farther from the cycle in which the collision occurred in the risk interval. For example, if such collision occurred in the cycle N, a given time distance will exist between the cycles N+1 of the two devices involve, and the time distance between the cycles N+2 will be longer than that of the cycles N+1.

Conversely, the starts of the transmission intervals with respective numbers of a radar device will be closer to the starts of the transmission intervals of the other radar device with numbers subsequent to the numbers of the first radar device. For example, the time distance between the start of the transmission interval N+1 of a first radar device and the start of the transmission interval N+2 of a second radar device will be longer than the time distance between the start of the transmission interval N+2 of the first radar device and the start of the transmission interval N+3 of the second radar device.

Therefore, great benefits will be achieved from combining the condition of the difference between the time delays $T_d$ preventing two collisions from occurring in consecutive risk intervals, and the condition related to the total duration of the detection cycle sequences equal to the number of radar devices, which prevents overlaps of transmission intervals in cycles with different numbers for different radar devices. Specifically, with this combination, the second number of consecutive detection cycles, for which the occurrence of more than one collision in risk intervals is prevented, is at least equal to the predetermined number of radar devices.

In a preferred aspect, the time delays $T_d$ of each pair of radar devices differ by less than the transmission time $T_t$. This is possible because the risk time $T_r$ is significantly less than the transmission time $T_t$, namely less than half the transmission time $T_t$. Moreover, in the preferred embodiments, the risk time $T_r$ is less than one tenth the transmission time $T_t$ and/or for each pair of radar devices the respective time delays $T_d$ differ by less than one tenth the transmission time $T_t$.

In one embodiment the transmission time $T_t$ is equal to 1 ms, and the risk time $T_r$ is equal to 200 ns. Therefore, the risk time $T_r$ can be not only less than one tenth of the transmission time $T_t$, but also than one hundredth or one thousandth of the transmission time $T_t$.

The time delays $T_d$ are in turn distributed among the different radar devices from zero to a certain multiple of the risk time $T_r$, which depends on various factors including the number of radar devices in use. In the above discussed embodiment, an exemplary maximum difference between the time delays $T_d$ of two radar devices is 21 μs, and hence, as discussed above, less than one tenth the transmission time $T_t$.

It may be appreciated that the time delays $T_d$ are much shorter than in the case in which any signal collision, either inside or outside the risk interval, should be avoided (as proposed in US 2006262009 A1). Moreover, since the base time $T_b$ must be longer than the time delays $T_d$, preferably greater than the product of the number of radar devices by the time delays $T_d$, the base time $T_b$ is also contained, and the detection cycle can have a significantly shorter duration, which provides apparent advantages. An example of base time $T_b$ is 5 ms.

The intervals in the figures are not in scale with the above described preferred examples, to better highlight intervals that would have been otherwise almost invisible. However, the intervals of FIG. 1 comply with the main restrictions on time delays $T_d$, which for each radar pair differ by more than twice the risk time $T_r$, and on the base time $T_b$, which is greater a the product of the maximum time delays $T_d$ by the number of radar devices.

With the above described detection cycles, the following processing logic may be used to significantly reduce or eliminate altogether the probability of false alarms generated by signal collisions.

In particular, as mentioned above, during each detection cycle a positive output or a negative output is selectively received from each radar device, depending on whether the signal detected by the radar device is or not compatible with the presence of an object to be detected in the environment.

Once these outputs have been received, a radar device is determined to have detected an object only when such radar device has provided positive outputs for a first number of consecutive detection cycles, which is at least equal to the predetermined number of radar devices.

As explained above, in fact, in the most unfortunate case, as shown in FIG. 1 for an embodiment with three radar devices, a single radar device can perform detection cycles in which collisions occur in the risk interval, at each consecutive cycle, with respective different radar devices. This can occur at most for a number of consecutive cycles equal to the number of radar devices less one. At the next detection cycle, a further positive output may represent only one object to be detected or a new collision at risk with a radar device with which a collision at risk had just occurred.

Nevertheless, with the transmission cycle as described above, the latter possibility is significantly reduced, and can be eliminated altogether in the embodiment in which, for each pair of radar devices, only one risk collision is admitted for sequences equal to at least the number of radar devices.

FIG. 1, for example, shows a sequence of three detection cycles, with numbers N, N+1 and N+2 (for the first radar device a fourth cycle N+3 is also shown). In the first cycle there is a collision at risk between the first and second devices. In the second cycle there is a collision at risk between the first and third devices. In the third cycle, with the conditions enforced (differences in time delays $T_d$ equal to at least twice the risk time $T_r$, and base time $T_b$ longer than any time delay $T_d$ multiplied by the number of radar devices), no overlap may occur between the first device and any other device. Therefore, if the first device provides three consecutive positive outputs, an object has been necessarily detected. It may be noted that a collision at risk exists in the third cycle between the second and third devices. However, this has no effect on the fact that in the third cycle the first device is unaffected by collisions at risk.

In a further aspect the invention relates to a method of setting the timing of transmission cycles of a plurality of radar devices. The method comprises selecting the transmission time $T_t$ common to all the radar devices and identifying the risk time $T_r$ given by the duration of the risk interval within the transmission interval. The method further includes selecting a different time delay $T_d$ for each radar device so that one or more of the conditions as described above with respect to the risk time $T_r$ will be fulfilled.

Then the method includes selecting the base time $T_b$ such that it will be greater than the product of the number of radar devices by the maximum of the time delays $T_d$ of the different radar devices. Finally, for each radar device the detection cycle is set with the alternation between a transmission interval and a wait interval given by the sum of the common base time $T_b$ and the respective time delay $T_d$.

A skilled person may obviously envisage a number of equivalent changes to the above discussed variants, without departure from the scope defined by the appended claims.

The invention claimed is:

1. A method of detecting objects in an environment, the method comprising:
   providing a predetermined number of radar devices, each configured to perform a sequence of detection cycles, each detection cycle comprising a transmission interval, in which the radar device transmits a predetermined electromagnetic signal in the environment for a transmission time that is common to all the radar devices, and a wait interval between two transmission intervals of consecutive detection cycles;
   wherein for each radar device, a duration of the wait interval is equal to a sum of a base time, that is common to all the radar devices, and a respective time delay, wherein the time delays of the radar devices are different from each other and the base time is greater than each of the time delays of the radar devices,
   during each detection cycle, receiving selectively, from each radar device, a positive output, indicating that the radar device is detecting an electromagnetic signal compatible with a presence of an object to be detected in the environment, or a negative output, indicating that the radar device is not detecting the electromagnetic signal compatible with the presence of the object to be detected in the environment;
   wherein for each radar device, the positive output is generated at least in case a signal collision begins within a risk interval, which begins from a start of the transmission interval and lasts for a predetermined risk time, which is shorter than the transmission time, wherein for each radar device, the negative output is generated at least in case the signal collision begins within the transmission interval but after the risk interval, and there are no objects to be detected in the environment, wherein the signal collision, for each radar device, is given by the radar device receiving, during its own transmission interval, the predetermined electromagnetic signal transmitted by another radar device, wherein for each pair of radar devices, the respective time delays differ at least by twice the risk time, but by less than the transmission time, and determining that the radar device has detected the object only when the radar device has provided the positive output for a first number of consecutive detection cycles, which is at least equal to the predetermined number of radar devices.

2. The method of claim 1, wherein the base time and the time delays are selected such that, for each pair of radar devices, no signal collision in the respective risk intervals may occur more than once in a second number of successive detection cycles which is equal to at least two.

3. The method of claim 1, further comprising:
detecting, at each detection cycle and for each radar device, a received electromagnetic signal after a start of the transmission of the predetermined electromagnetic signal;
wherein the positive output is generated if the received electromagnetic signal is compatible with the presence of the object to be detected in the environment within a maximum predetermined distance from the radar device, and
wherein a time taken for the received electromagnetic signal to travel from the radar device to an object placed at the maximum predetermined distance, be reflected by the object, and return to the radar device is less than or equal to preferably equal to the risk time.

4. The method of claim 1, further comprising:
combining, for each radar device, the predetermined electromagnetic signal and an electromagnetic signal received by the radar device, thereby obtaining a combined signal having a frequency given by an increasing function of a time distance between a start of the transmission of the predetermined electromagnetic signal and a start of detection of a received electromagnetic signal; and
applying a low-pass filter to the combined signal to generate a filtered signal, wherein the filter is configured to dampen signal components whose frequency is higher than a risk frequency, which corresponds according to the increasing function to a time distance of the received electromagnetic signal, from the start of the transmission of the predetermined electromagnetic signal, that is equal to the risk time.

5. The method of claim 1, wherein the risk time is less than one tenth of the transmission time and/or for each pair of radar devices the respective time delays differ by less than one tenth of the transmission time.

6. The method of claim 1, wherein for each pair of radar devices, the respective time delays differ from each other by at least a sum of twice the risk time and a delay margin, which is given by an estimate of a maximum time between an electromagnetic signal transmission trigger time and an actual electromagnetic signal transmission start time for the radar devices.

7. The method of claim 1, wherein the time delays are selected as a sum, for each radar device, of a fixed delay component and a random delay component, and
wherein the fixed delay components are equally spaced for the various radar devices.

8. The method of claim 1, wherein the base time and the time delays are selected such that, for each pair of radar devices, comprising a first radar device associated with a longer time delay and a second radar device associated with a shorter time delay, during a total time taken for the first radar device to perform a number of complete detection cycles equal to the predetermined number of radar devices, the second radar device performs a number of complete detection cycles less than the predetermined number of radar devices plus one.

9. The method of claim 1, wherein the base time is greater than a product of the predetermined number of radar devices and each of the time delays of the radar devices.

10. The method of claim 1, wherein each radar device is configured, during the wait time, to remain substantially silent or transmit an electromagnetic signal differing from the predetermined electromagnetic signal.

11. The method of claim 1, wherein the base time and the time delays are selected such that, for each pair of radar devices, no signal collision in the respective risk intervals may occur more than once in a second number of successive detection cycles which is at least equal to the predetermined number of radar devices.

12. The method of claim 1, further comprising:
detecting, at each detection cycle and for each radar device, a received electromagnetic signal after a start of the transmission of the predetermined electromagnetic signal;
wherein the positive output is generated if the received electromagnetic signal is compatible with the presence of the object to be detected in the environment within a maximum predetermined distance from the radar device, and
wherein a time taken for the received electromagnetic signal to travel from the radar device to an object placed at the maximum predetermined distance, be reflected by the object, and return to the radar device is equal to the risk time.

13. The method of claim 1, wherein for each pair of radar devices, the respective time delays differ from each other by at least a sum of twice the risk time and a delay margin, wherein the delay margin is equal to the risk time.

14. A system for detecting objects in an environment, the system comprising:
a predetermined number of radar devices, each configured to perform a sequence of detection cycles, each detection cycle comprising a transmission interval, in which the radar device transmits a predetermined electromagnetic signal in the environment for a transmission time that is common to all the radar devices, and a wait interval between two transmission intervals of consecutive detection cycles;
wherein for each radar device, a duration of the wait interval is equal to a sum of a base time, that is common to all the radar devices, and a respective time delay, wherein the time delays of the radar devices are different from each other and the base time is greater than each of the time delays of the radar devices, and a plurality of controllers, each controller associated with a respective radar device and configured, during each detection cycle, to selectively receive, from the respective radar device, a positive output, indicating that the radar device is detecting an electromagnetic signal compatible with a presence of an object to be detected in the environment, or a negative output, indicating that the radar device is not detecting the electromagnetic signal compatible with the presence of the object to be detected in the environment;

wherein each radar device is configured to generate the positive output at least in case a signal collision begins within a risk interval, which begins from a start of the transmission interval and lasts throughout a predetermined risk time, which is shorter than the transmission time, wherein each radar device is configured to generate the negative output at least in case the signal collision begins within the transmission interval but after the risk interval, and there are no objects to be detected in the environment, wherein the signal collision, for each radar device, is given by the radar device receiving, during its own transmission interval, the predetermined electromagnetic signal transmitted by another radar device, wherein for each pair of radar devices, the respective time delays differ at least by twice the risk time, but by less than the transmission time, and wherein each controller is configured to determine that the respective radar device has detected the object only after the radar device has provided the positive output for a first number of consecutive detection cycles, which is at least equal to the predetermined number of radar devices.

15. The system of claim 14, wherein each radar device comprises a plurality of transceivers, and wherein each controller is configured to coordinate the transceivers of the respective radar device to avoid a simultaneous transmission of the predetermined electromagnetic signal by distinct transceivers of the radar device.

* * * * *